April 18, 1933.  J. D. BURKHOLDER  1,904,823
AUTOMATIC TIRE GAUGE
Filed March 10, 1930
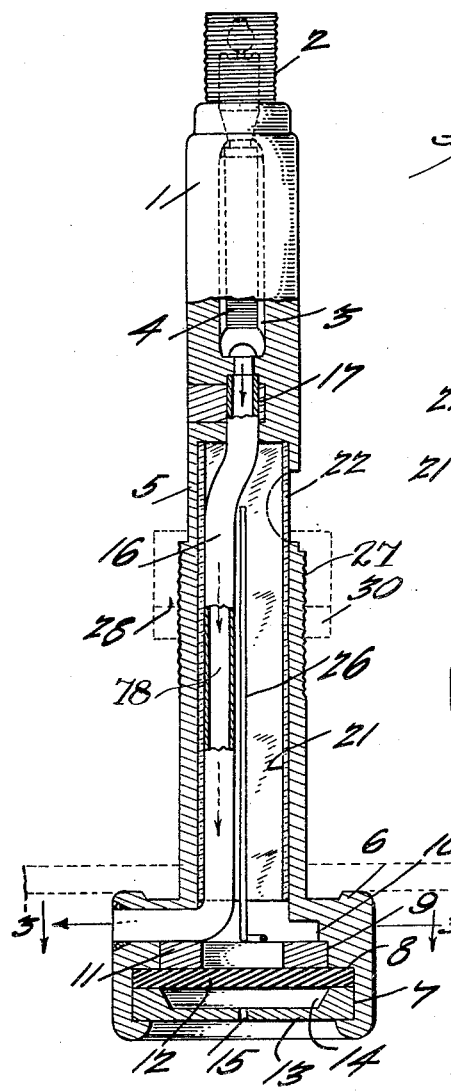
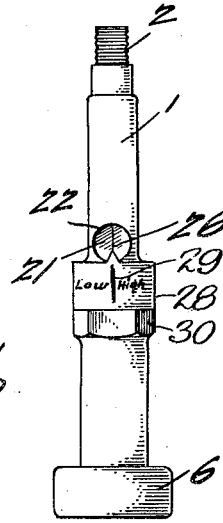
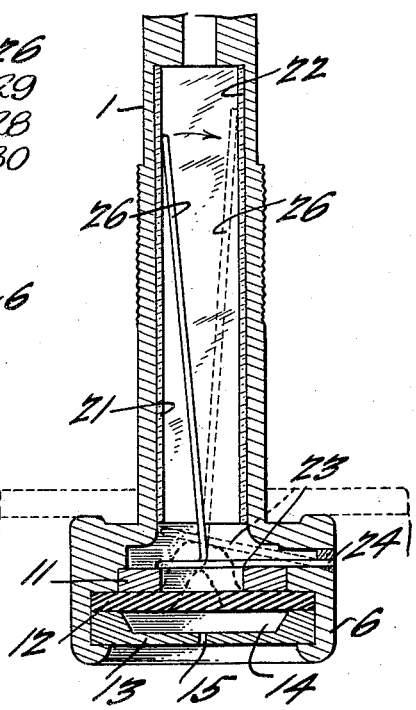
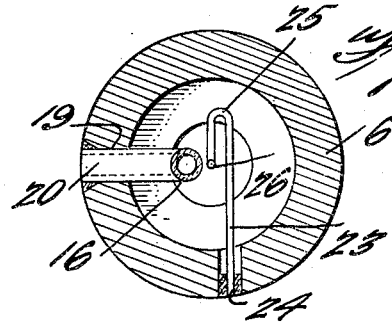
Inventor
JOHN D. BURKHOLDER
By
Attorney Patented Apr. 18, 1933

1,904,823

UNITED STATES PATENT OFFICE

JOHN D. BURKHOLDER, OF HARRISONBURG, VIRGINIA, ASSIGNOR TO AUTOMATIC DEVICES, INC., OF HARRISONBURG, VIRGINIA, A CORPORATION OF VIRGINIA

AUTOMATIC TIRE GAUGE

Application filed March 10, 1930. Serial No. 434,735.

This invention is directed to an improvement in self-contained tire gauges wherein the pressure within the inner tube is continuously indicated between the maximum and minimum range of the gauge.

The primary object of the invention is the provision of a tire gauge in which the inherent resistance of the gauging element is constant for all gauging positions, thereby insuring that such resistance will form no variable factor in the gauging operation regardless of indicated pressure.

A further object of the present invention is the provision of a self-contained tire gauge mounted wholly within the stem of the tube, with the parts so arranged and related that such stem is of substantially normal diameter and length, thus permitting the use of the gauge with conventional tubes, rims and wheels.

The invention is illustrated in the accompanying drawing, in which:—

Figure 1 is a vertical longitudinal section through the improved gauge.

Figure 2 is a similar view taken at right angles to Figure 1.

Figure 3 is a transverse sectional view on the line 3—3 of Figure 1.

Figure 4 is a view in elevation of the improved gauge.

The improved gauge comprises a valve stem 1 which, for the purpose of this invention, is substantially of the same dimensions as the conventional valve stem. The stem is formed at the upper end 2 for the reception of the usual cap and throughout the upper portion with a longitudinally ranging bore 3 for the reception of the conventional valve assembly 4. Below the bore 3 the stem is formed with a very materially enlarged bore 5, the stem being formed at the lower end with a disk head 6 adapted to be secured within the inner tube in the usual manner. The disk head forms an interior chamber directly communicating with the enlarged bore 5, this chamber throughout the lower portion of the disk head being circumferentially enlarged at 7, with such enlargement opening through the lower surface of the disk head and terminating in an abrupt shoulder 8. Immediately above the enlargement 7 the chamber is also formed to provide an enlargement over its normal diameter but materially less than the enlargement 7, this second enlargement being indicated at 9 and terminating in an abrupt shoulder 10. A metal disk 11, having important functions to be later referred to, is accurately seated in the enlargement 9 and bears against the shoulder 10.

Underlying the disk 11 is a flexible diaphragm 12, preferably of rubber, the diameter of which corresponds to that of the enlargement 7, and the diaphragm is positioned against the lower surface of the disk 11 and against the shoulder 8. A cap piece 13 accurately fits within the enlargement 7 and bears against the lower surface of the diaphragm 12. This cap piece is recessed to form a central cavity 14 which directly underlies the diaphragm 12 and has a diameter substantially coextensive with the external diameter of the disk 11, the cap piece being further formed with a central opening 15 of comparatively small diameter which opens through the lower surface of the cap piece and at its upper end into the cavity 14. The free edges of the disk head 6 below the cap piece are turned inwardly onto the cap piece to more or less rigidly fix the cap piece, diaphragm and disk 11 in place.

As thus arranged, it will be noted that the diaphragm 12 overlies a cavity 14 in the cap piece and underlies a central opening in the metal disk 11, which central opening is substantially less than the interior diameter of the enlarged bore 5 of the stem.

An air tube 16 establishes communication between the bore 3 and the inner tube. This air tube has an upper portion 17 in line with the bore 3 and an off-set lower portion 18 which extends throughout the length of the enlarged bore 5 and has a lower lateral terminal 19 which opens through one side edge of the disk head 6 by which air may be admitted to the inner tube. The portion 18 of the air tube is arranged immediately adjacent the wall of the enlarged bore 5, and as the air tube is of materially less diameter than that of the bore 5, there is a very material area of such bore not occupied by the air tube. The stem is formed with a lateral opening 20 to facilitate the positioning of the off-set portions of the air tube, this opening 20 being subsequently filled with solder or other sealing agent, the juncture of the outlet of the lateral portion 19 of the air tube being also sealed to the immediately adjacent surface of the disk head 6.

The transparent tube 21 extends throughout the length of the bore 5 and is effectively sealed in place against leakage around the stem, and adjacent its upper end the wall of the bore 5 of the stem is formed with an opening 22, bridged of course by the transparent tube 21 and forming a sight opening for the reading of the gauge.

The gauging element proper includes a bar 23 of spring material preferably secured in an opening 24 formed in the disk head 6 and laterally of and above the metal disk 11. This bar 23 extends in normal position, that is in the absence of that pressure corresponding to the minimum indication of the gauge, across the central opening of the disk 11 and rests upon the upper surface of this disk. The end of the bar remote from its fixed end is formed in a returned bend 25 and at a point centrally of the opening in the disk 11 the bar is deflected upwardly in the form of a rod 26 which extends lengthwise of the bore 5 within the transparent tube 21 and with its free upper end well within the plane of the sight opening previously referred to.

The gauge is designed primarily to indicate a normal tube pressure when the upper end of the rod 26 is substantially in the center of the sight opening. Deflection of this end in one direction will indicate a less than normal pressure and its deflection in the opposite direction will indicate an excess above normal pressure. Of course, the sight opening, or more particularly the transparent covering therefor, may be marked with graduations suitably indicating pounds or other indicia, though this detail is unimportant from the standpoint of the present invention.

In applied position, it will be apparent that the pressure in the inner tube will find its way through the opening 15 and move the central portion of the diaphragm upwardly, as indicated in dotted lines in Figure 2. This will raise the free end of the rod 23 against its inherent resiliency and tend to deflect the free upper end of the rod 26 for indicating purposes. Of course, it is understood that when the parts are in normal position the upper end of the indicating rod is at one extreme of the sight opening, so that as the pressure rises to the normal point the upper end of the indicating rod gradually approaches the center line of the sight opening, at which under normal tire pressure it will remain. Of course, excess or reduced pressure will be indicated by corresponding positions of the upper end of the indicating rod.

The cavity 14 formed in the cap piece 13 is of importance in avoiding a tendency to improper gauging of the pressure incident to the application of the parts. When the parts are assembled and the edges of the flexible diaphragm secured in place under pressure, it will be apparent that there is a tendency for the central or free portion of the diaphragm to bulge or be deflected. If this deflection is not permitted in the normal direction, which is downward, it will necessarily result in an upward deflection of the diaphragm. This deflection will be a permanent one and will, of course, result in an inaccuracy in the gauging operation, for under these circumstances the deflection will be in the direction in which the air pressure tends to deflect the diaphragm and hence a portion of the deflection tending to operate the gauge rod would not be the direct result of pressure within the tube. It is obvious that the metal disk 11 so spaces the diaphragm from the indicator that the diaphragm must be subjected to a sufficient pressure to deflect it at least throughout this space. Thus the disk 11, which is obviously the means by which the deflected diaphragm is guided into operative coaction with the indicator, provides a means by which the diaphragm will cooperate with the indicator only under a predetermined pressure below the diaphragm, that is, only under a predetermined pressure in the tube.

Furthermore, the metal disk 11 is of importance in order that accurate gauging properties may result. By varying the central bore of this disk or its thickness, it will be quite apparent that the gauging effect of the contained air in the inner tube may be readily varied and through the instrumentality of this disk 11 alone the gauge may be initially set, as will be quite obvious, for tires requiring a normal low pressure or for tires requiring a normal high pressure without the necessity of varying the other details of the gauge construction.

The inherent resiliency of the gauging bar provides a fixed factor of resistance which remains the same under all conditions and, therefore, need not be taken into consideration as it cannot vary the effect of different pressures on the same gauging implement. This is important, for where the inherent resistance of the gauging implement varies with its position, it will be quite apparent that accurate gauging of the contained tube pressure is impossible.

Furthermore, by providing the stem with an enlarged bore and providing a separate air tube which occupies but a portion of this bore, the construction of the gauge is materially simplified and its overall diameter need not be materially increased over the diameter of the normal tube stem. On the contrary, where gauges of this type require two independent bores in the stem, the necessity for providing suitable metal support necessitates a material increase in the diameter of the stem as compared with that of the normal stem. Thus the gauging implement of the present invention is readily adapted for use with the conventional tube, rim and wheel and no particular change in any of these parts is necessary.

The gauge may be used as a variable pressure indicator by arranging a fixed element opposite the sight opening to indicate a desired pressure when the rod 26 coincides therewith. To provide a simple means to this end, the exterior of the valve stem immediately below the sight opening is exteriorly threaded at 27, with which an indicator in the shape of a nut 28 provided with points 29 cooperates. A lock nut 30 is arranged to secure the indicator in place. Assuming that the tire are to be inflated to a predetermined pressure, say thirty-five pounds, this pressure is introduced into the tube and the indicator 28 is turned until the point 29 thereon is in line with the then position of the uper end of the rod 26, the lock nut 30 being used to fix the indicator in this position. Thereafter the tire may be inflated until the upper end of the rod 26 registers with the point 29, when it will be known that the proper pressure is within the tube. The position of the end of rod 26 at either side of the point 29 will, of course, indicate less or greater pressure than that desired.

What is claimed as new is:—

1. A tire gauge including a stem terminating at its lower end in a disk head and formed above the disk head with an enlarged bore, a sight opening formed in the wall of the enlarged bore, a transparent tube fitted within the enlarged bore and sealed against leakage, a metal disk held in the disk head and providing a central opening in line with the enlarged bore, a diaphragm underlying the metal disk, a cap piece underlying the diaphragm and securing the peripheral edges of such diaphragm in fixed relation, said disk head having a cavity underlying the diaphragm and being formed with an opening to admit pressure from the inner tube to the cavity beneath the diaphragm, the thickness and diameter of the central opening of the metal disk determining the range variations of the gauge.

2. A tire gauge including a tube stem, means within the tube stem for frictionless indicating of the pressure of the tire, a disk formed with a central opening, a diaphragm open to the pressure within the tube stem and deflected by said pressure through the opening in the disk to thereby engage and operate said pressure indicating means, said disk determining the indicating range of the gauge by the thickness and diameter of the central opening in said disk.

3. A tire gauge including a tube stem, a gauge indicator carried by the stem, a diaphragm open to the pressure within the tube stem and designed to operate the indicator, and a disk having an opening therethrough and overlying the diaphragm for preventing diaphragm operation of the indicator until the pressure within the tube has reached a predetermined point.

4. A tire gauge for tire inner tubes including a tube stem, a gauge indicator carried thereby, a diaphragm responsive to tube pressure for operating the indicator, and means for confining tube pressure displacement of the diaphragm to a limited area of such diaphragm, said means further compelling a predetermined tube pressure displacement of the diaphragm prior to an initial operation of the indicator by the diaphragm.

5. A tire gauge for tire inner tubes including a tube stem, a frictionless gauge indicator mounted in the stem, a diaphragm responsive to pressure from within the tube and serving under a predetermined pressure to operate the indicator, and means arranged in the stem and underlying the indicator and determining that tube pressure deflection of the diaphragm necessary to engage and operate the indicator.

6. A tire gauge including a tube stem, a movable indicator therein, a diaphragm responsive to tube pressure for operating the indicator, and means for spacing the diaphragm and indicator to compel a limited area of the diaphragm to be movable by the tube pressure.

7. A tire gauge including a tube stem, a movable indicator arranged therein, a disk formed with a central opening and directly underlying the indicator, a diaphragm underlying the disk and responsive to tube pressure, the disk being formed with a central opening through which the diaphragm is projected under tube pressure to engage and operate the indicator.

In testimony whereof I affix my signature.

JOHN D. BURKHOLDER. [L. S.]